(12) United States Patent
Takenaka et al.

(10) Patent No.: US 8,310,452 B2
(45) Date of Patent: Nov. 13, 2012

(54) TOUCH PANEL DISPLAY APPARATUS, ELECTRONIC DEVICE HAVING TOUCH PANEL DISPLAY APPARATUS, AND CAMERA HAVING TOUCH PANEL DISPLAY APPARATUS

(75) Inventors: Mikio Takenaka, Kanagawa (JP); Shigeaki Maruyama, Kanagawa (JP); Junichi Sekine, Kanagawa (JP)

(73) Assignee: Sony Corporation, Tokyo (JP)

( * ) Notice: Subject to any disclaimer, the term of this patent is extended or adjusted under 35 U.S.C. 154(b) by 949 days.

(21) Appl. No.: 11/487,873

(22) Filed: Jul. 17, 2006

(65) Prior Publication Data
US 2007/0035526 A1    Feb. 15, 2007

(30) Foreign Application Priority Data
Jul. 29, 2005    (JP) ................. 2005-220845

(51) Int. Cl.
*G09G 5/00*    (2006.01)
(52) U.S. Cl. ........ 345/173; 345/156; 345/179; 361/600; 341/34; 340/407.1
(58) Field of Classification Search ........... 345/156–173
See application file for complete search history.

(56) References Cited

U.S. PATENT DOCUMENTS

| | | | | |
|---|---|---|---|---|
| 4,931,765 A * | 6/1990 | Rollins et al. | ............... | 340/407.1 |
| 5,619,181 A * | 4/1997 | Murray | ....................... | 340/407.1 |
| 6,118,435 A * | 9/2000 | Fujita et al. | .................... | 345/173 |
| 6,259,935 B1 * | 7/2001 | Saiki et al. | .................... | 455/567 |
| 6,337,678 B1 * | 1/2002 | Fish | ............................. | 345/156 |
| 6,402,620 B1 * | 6/2002 | Naghi | ............................. | 463/47 |
| 6,429,846 B2 * | 8/2002 | Rosenberg et al. | ........... | 345/156 |
| 6,809,635 B1 * | 10/2004 | Kaaresoja | ................... | 340/407.1 |
| 7,039,866 B1 * | 5/2006 | Rosenberg et al. | ........... | 715/701 |
| 7,131,073 B2 * | 10/2006 | Rosenberg et al. | ........... | 715/856 |
| 7,166,795 B2 * | 1/2007 | Lengeling | ........................ | 84/737 |
| 7,324,094 B2 * | 1/2008 | Moilanen et al. | ............. | 345/173 |
| 7,443,384 B2 * | 10/2008 | Harada et al. | .................. | 345/173 |
| 2002/0033795 A1 * | 3/2002 | Shahoian et al. | ............. | 345/156 |
| 2004/0204149 A1 * | 10/2004 | Kaneda et al. | ................ | 455/567 |
| 2005/0219228 A1 * | 10/2005 | Alameh et al. | ................ | 345/173 |
| 2006/0022952 A1 * | 2/2006 | Ryynanen | ..................... | 345/173 |
| 2009/0156266 A1 * | 6/2009 | Linjama et al. | ............... | 455/567 |

FOREIGN PATENT DOCUMENTS

| | | | |
|---|---|---|---|
| JP | 09-167541 | | 6/1997 |
| JP | HEI 09-167541 | | 6/1997 |
| JP | 2003-058321 | | 2/2003 |
| JP | 2003058321 A | * | 2/2003 |
| JP | 2003-288158 | | 10/2003 |
| JP | 2005-509941 | | 4/2005 |

* cited by examiner

*Primary Examiner* — Grant Sitta
(74) *Attorney, Agent, or Firm* — Robert J. Depke; Rockey, Depke & Lyons, LLC

(57) ABSTRACT

Disclosed herein is a touch panel display apparatus including: a display panel; a movable panel unit including a touch panel and being flat plate-like in shape; a movable support section for supporting the movable panel unit on a support structure so as to permit the movable panel unit to be moved along a plane parallel to the panel surface of the movable panel unit; an actuator configured to drive the movable panel unit to vibrate; an actuator drive control section for outputting an actuator drive signal to drivingly control the actuator; an acoustic pressure generating member configured to generate an acoustic pressure by being driven by the actuator to vibrate; and a superposing section for superposing an acoustic signal on the actuator drive signal outputted by the actuator drive control section.

13 Claims, 4 Drawing Sheets

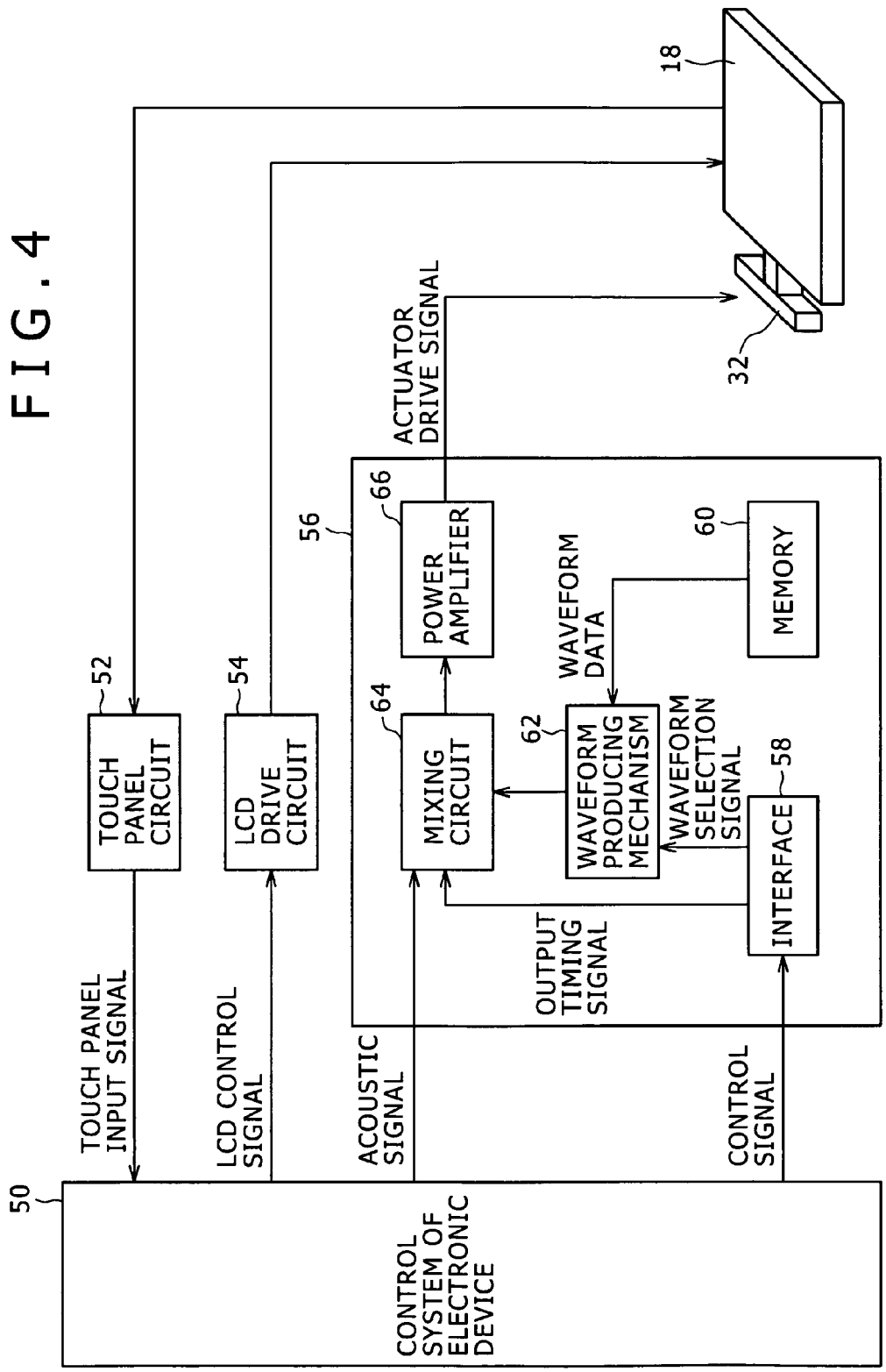

TOUCH PANEL DISPLAY APPARATUS, ELECTRONIC DEVICE HAVING TOUCH PANEL DISPLAY APPARATUS, AND CAMERA HAVING TOUCH PANEL DISPLAY APPARATUS

CROSS REFERENCES TO RELATED APPLICATIONS

The present invention contains subject matter related to Japanese Patent Application JP 2005-220845 filed in the Japanese Patent Office on Jul. 29, 2005, the entire contents of which being incorporated herein by reference.

BACKGROUND OF THE INVENTION

1. Field of the Invention

The present invention relates to a touch panel display apparatus, an electronic device having a touch panel display apparatus, and a camera having a touch panel display apparatus.

2. Description of the Related Art

Touch panel display apparatuses used as an input device or an input/output device have such a flexibility as not to be obtainable with input devices using mechanical switched, since the input screen of a touch panel display apparatus can be freely configured by software. In addition, the touch panel display apparatuses have a number of merits such as light-weight and compact configurations obtainable and a low frequency of occurrence of mechanical failure. Thus, at present, touch panel display apparatuses are utilized widely, from console panels of various machines which are comparatively large to input/output devices of portable apparatuses which are very small.

Many touch panel display apparatuses are so configured that a user's fingertip touches a flat and smooth panel surface. Therefore, a feedback to the user through a tactile sensation on the fingertip, such as a click feeling felt by the fingertip at the time of operating an input device configured by use of mechanical switches, is absent in using the touch panel display apparatuses, which has made unreliable the feeling of operating the touch panel display apparatuses. In order to improve this problem, a touch panel display apparatuses designed to feed back a tactile sensation to the user's fingertip is disclosed in Japanese Patent Laid-open No. 2003-288158. The touch panel display apparatus disclosed in Japanese Patent Laid-open No. 2003-288158 has a configuration in which a touch panel touched by the user's fingertip is vibrated in a direction perpendicular to the panel surface, thereby generating a tactile sensation on the user's fingertip.

SUMMARY OF THE INVENTION

However, in the touch panel display apparatus disclosed in Japanese Patent Laid-open No. 2003-288158, an actuator for generating a vibration should be displayed between the touch panel and a display panel, between the display panel and a backlight, or between the backlight and a frame, which makes it difficult to reduce the thickness of the apparatus. On the other hand, in the case of a touch panel of the film type which has been becoming a main stream among mobile apparatuses, a touch panel is adhered directly to a display panel, and the display panel itself is vibrated. However, for vibrating a liquid crystal display panel, for example, in a direction perpendicular to the panel surface, a quite large drive force may be necessary, which leads to an increase in power consumption. In addition, at the time of vibrating a liquid crystal display panel in a direction perpendicular to the panel surface thereof, a ribbon cable connected to the liquid crystal display panel generates an asymmetric resisting force, which makes it difficult to obtain a uniform vibration by using one actuator. The difficulty in obtaining a uniform vibration means difficulty in realizing a display panel having also the function as an acoustic output device.

Thus, it is desirable to provide a touch panel display apparatuses configured as to generate a tactile sensation on the user's fingertip operating the display, which can be easily reduced in size, thickness and weight, which consumes less electric power, which does not need a large number of actuators, and which has also the function as an acoustic output device.

According to an embodiment of the present invention, there is provided a touch panel display apparatus including: a display panel; a movable panel unit including a touch panel and being flat plate-like in shape; a movable support section configured to support the movable panel unit on a support structure so as to permit the movable panel unit to be moved along a plane parallel to the panel surface thereof; an actuator configured to drive the movable panel unit to vibrate; an actuator drive control section configured to output an actuator drive signal to drivingly control the actuator; an acoustic pressure generating member configured to generate an acoustic pressure by being driven by the actuator to vibrate; and a superposing section configured to superpose an acoustic signal on the actuator drive signal outputted by the actuator drive control section; wherein the actuator drives the movable panel unit to vibrate along the plane parallel to the panel surface thereof, whereby a tactile sensation is generated on a user's fingertip making contact with the panel surface of the movable panel unit; and the actuator drives the acoustic pressure generating member to vibrate according to the acoustic signal, whereby a sound is generated.

According to another embodiment of the present invention, there is provided an electronic device including a casing or frame and a touch panel display apparatus, wherein the touch panel display apparatus includes: a display panel; a movable panel unit including a touch panel and being flat plate-like in shape; a movable support section configured to support the movable panel unit on a support structure so as to permit the movable panel unit to be moved along a plane parallel to the panel surface thereof; an actuator configured to drive the movable panel unit to vibrate; an actuator drive control section configured to output an actuator drive signal to drivingly control the actuator; an acoustic pressure generating member configured to generate an acoustic pressure by being driven by the actuator to vibrate; and a superposing section configured to superpose an acoustic signal on the actuator drive signal outputted by the actuator drive control section; wherein the actuator drives the movable panel unit to vibrate along the plane parallel to the panel surface thereof, whereby a tactile sensation is generated on a user's fingertip making contact with the panel surface of the movable panel unit; and the actuator drives the acoustic pressure generating member to vibrate according to the acoustic signal, whereby a sound is generated.

According to a further embodiment of the present invention, there is provided a camera including a casing or frame and a monitor, the monitor including a touch panel display apparatus, wherein the touch panel display apparatus includes: a display panel; a movable panel unit including a touch panel and being flat plate-like in shape; a movable support section configured to support the movable panel unit on a support structure so as to permit the movable panel unit to be moved along a plane parallel to the panel surface thereof; an actuator configured to drive the movable panel unit to vibrate; an actuator drive control section configured to output an actuator drive signal to drivingly control the actuator; an acoustic pressure generating member configured to generate an acoustic pressure by being driven by the actuator to vibrate; and a superposing section configured to superpose an acoustic signal on the actuator drive signal outputted by the actuator drive control section; wherein the actuator drives the movable panel unit to vibrate along the plane parallel to the panel surface thereof, whereby a tactile sensation is generated on a user's fingertip making contact with the panel surface of the movable panel unit; and the actuator drives the acoustic pressure generating member to vibrate according to the acoustic signal, whereby a sound is generated.

According to an embodiment the present invention, in order to generate a tactile sensation on a user's fingertip making contact with a panel surface, a movable panel unit is vibrated not in the direction perpendicular to the panel surface but along a plane parallel to the panel surface. Therefore, the movable panel unit can be vibrated by a small-type actuator having a small drive force, while obviating vibration of air at the panel surface. Accordingly, a touch panel display apparatuses configured as to generate a tactile sensation on a user's fingertip operating the display can be realized which can be easily reduced in size, thickness and weight, which consumes less electric power, which does not need a large number of actuators, and which has also the function as an acoustic output device.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a block diagram of a control mechanism and an electronic circuit which are components of the touch panel display apparatus.

DETAILED DESCRIPTION OF THE PREFERRED EMBODIMENTS

Figure 1:
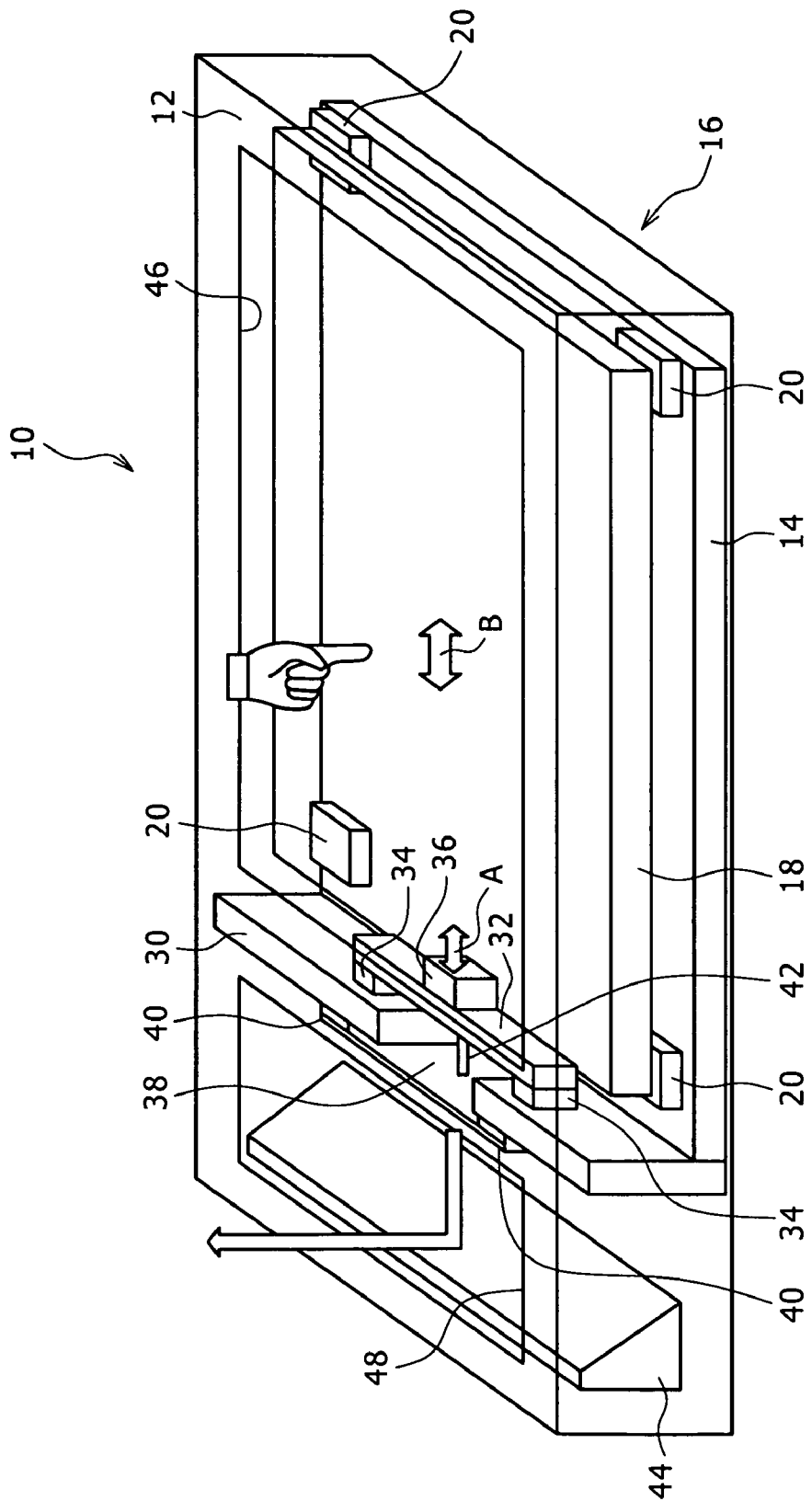
FIG. 1 is a schematic perspective view of a touch panel display apparatus according to an embodiment of the present invention.
Figure 2:
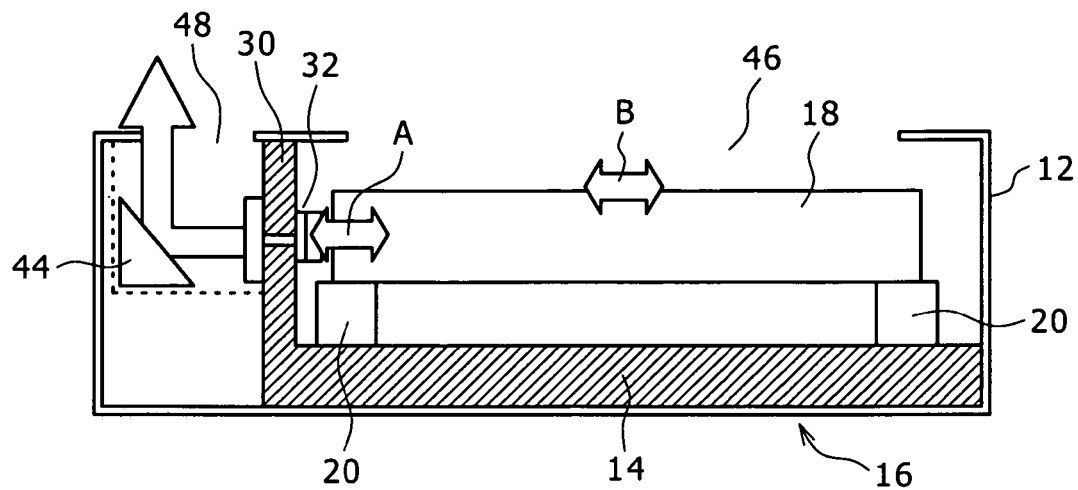
FIG. 2 is a schematic side view of the touch panel display apparatus shown in FIG. 1.
Figure 3:
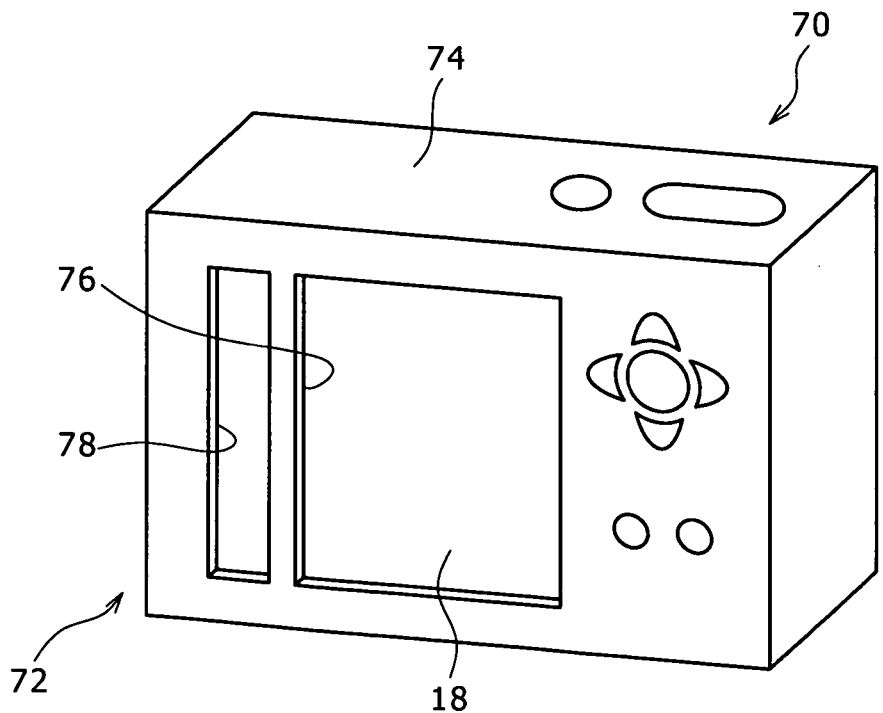
FIG. 3 is a perspective view showing the back side of a camera according to an embodiment of the present invention.
Figure 5A:
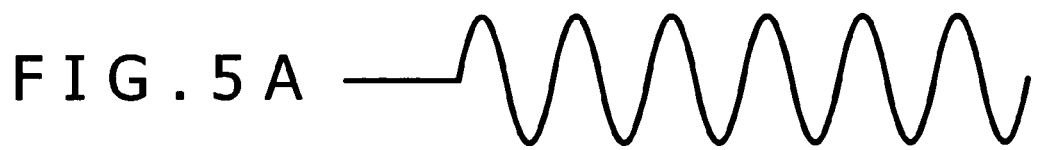
FIGS. 5A to 5D show specific examples of a waveform produced by a waveform producing mechanism.
Figure 5B:
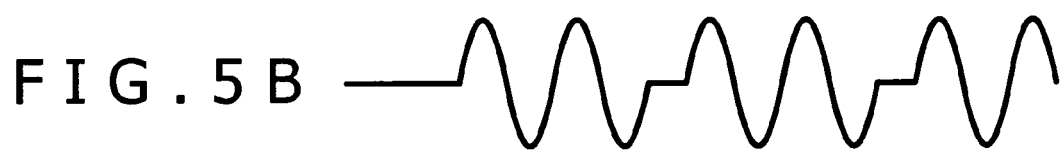
Figure 5C:
Figure 5D:
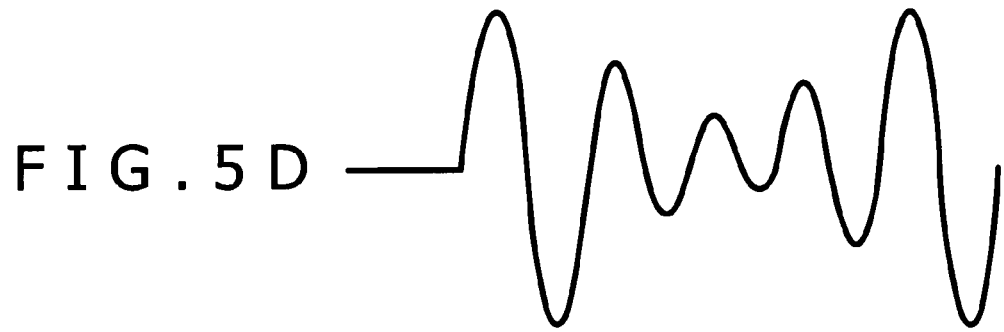

Now, some embodiments of the present invention will be described below. FIG. 1 is a schematic perspective view of a touch panel display apparatus according to an embodiment of the present invention, and FIG. 2 is a schematic side view of the same. These figures are schematic views for making clear the principle of the present invention, and, in the figures, the length-to-thickness ratios and the like of members and the shapes of the members are not drawn properly. FIG. 3 is a perspective view showing the back side of a camera having a still picture shooting function and a motion picture shooting function, which is an electronic device according to an embodiment of the present invention. The camera shown in FIG. 3 has a casing or frame and a monitor, and the monitor includes the touch panel display apparatus shown in FIGS. 1 and 2. Incidentally, the touch panel display apparatus shown in FIGS. 1 and 2 are used as the monitor in the camera and also widely used as an input device or input/output device in various electronic devices having a casing or frame. Especially, according to an embodiment of the present invention, a touch panel display apparatus can be configured to be light in weight and compact and to consume less electric power; therefore, the present invention can display great merits when applied to mobile type electronic devices.

In FIG. 1, reference numeral 10 denotes the whole body of a touch panel display apparatus, and reference numerals 12 and 14 denote respectively a casing and a frame of an electronic device (a camera shown in FIG. 3 or the like) including the touch panel display apparatus 10. The casing 12 and the frame 14 are firmly joined to each other, and various components of the electronic device are supported eventually the casing 12 or the frame 14; in the following description, therefore, the casing 12 and the frame 14 are generically referred to as a support structure 16. The touch panel display apparatus 10 has a flat plate-shaped movable panel unit 18 rectangular in plan view, and the movable panel unit 18 is configured by adhering a sheet type touch panel to a surface of a liquid crystal display panel. Therefore, the liquid crystal display panel and the touch panel are integrally jointed to constitute the movable panel unit 18, and the surface of the movable panel unit 18 constitutes a panel surface to be touched by a fingertip of the user intending to operate the touch panel display apparatus 10.

The movable panel unit 18 is supported, through a movable support section, on the support structure 16 so as to be displaceable along a plane parallel to the panel surface. The movable support section includes small elastic material blocks 20 provided between the movable panel unit 18 and the support structure 16, at four corners on the back side of the movable panel unit 18. The movable panel unit 18 is displaced along the plane parallel to the panel surface, through elastic shearing deformation of the elastic material blocks 20. The movable support section is desirably so configured that the movable panel unit 18 can be displaced as easily as possible. For this purpose, the elastic material blocks 20 are preferably formed of a polymeric gel material having an ultra-low hardness. For example, a sheet form ultra-low-hardness polymeric gel material available from KITAGAWA INDUSTRIES CO., LTD. under the product name "KG Gel (trademark)" is especially suitable for use as the material of the elastic material blocks 20. To be more specific, for example, a 1 mm-thick sheet of "KG Gel (trademark)" is cut to a size of 2 mm square, thereby forming elastic material blocks 1 mm in height, and both the upper and lower surfaces of the elastic material blocks are adhered respectively to the support structure 16 and the movable panel unit 18 by use of double-faced adhesive sheets or the like, whereby the movable support section for the movable panel unit 18 can be configured suitably. Other materials than the polymeric gel material for the elastic material blocks 20 include various rubber materials, soft polyethylene, and silicone resins. In addition, the movable support section for supporting the movable panel unit 18 on the support structure 16 is not limited to that which is composed of the elastic material blocks 20 as above-mentioned, and may be any of other various configurations; for example, the movable support section may be configured by use of rolling elements such as balls and rollers, or by use of a low-friction material such as polytetrafluoroethylene resin.

Besides, the configuration of the movable panel unit 18 is also not limited to the above-mentioned. For example, instead of integrating the touch panel and the display panel, the display panel may be fixed on the support structure 16 and the touch panel may solely constitute the movable panel unit 18. In this case, the movable panel unit 18 is so disposed that the touch panel constituting the movable panel unit 18 is located as such a position as to overlap with the display panel. According to this configuration, the touch panel is supported so as to be displaceable along a plane parallel to the panel surface. Furthermore, the display panel is not limited to the liquid crystal display panel, and other various display panels may be adopted. For example, an organic electroluminescence display panel and the like are display panels suitable for carrying out the present invention.

As shown in FIGS. 1 and 2, the support structure 16 is provided with a fixed wall 30 oppositely to one side of the flat plate-shaped movable panel unit 18 rectangular in plan view. The fixed wall 30 is defined by the frame 14 of the electronic device and, therefore, constitutes a part of the support structure 16. The fixed wall 30 shows discontinuity at a longitudinally central portion thereof, where an opening is formed. In addition, an actuator 32 is disposed between the one side of the movable panel unit 18 and the fixed wall 30 which face to each other. The present invention can be carried out by use of one of various actuators; for example, a vibrational actuator using an electric motor or the like can be used. In order to achieve a lightweight and compact configuration, however, it is particularly preferable to use a bending displacement type piezoelectric actuator which is elongate plate-like in shape. As this type of piezoelectric actuator, a bimorph type piezoelectric actuator and a monomorph type piezoelectric actuator are known. Of these types of piezoelectric actuators, the bimorph type is preferred because it can display a stronger drive force. Besides, comparing a single-layer bimorph type piezoelectric actuator with a laminate bimorph type piezoelectric actuator, the former is more suitable for use in mobile electronic devices, since it can be driven at a lower voltage. Accordingly, in the embodiment shown in the figures, a laminate bimorph type piezoelectric actuator is used as the actuator 32. Incidentally, while in FIGS. 1 and 2 the actuator 32 is drawn by exaggerating the thickness size thereof for ease of understanding the structure, the actual laminate bimorph type piezoelectric actuator is by far thinner than that shown in the figures, and is a very lightweight actuator.

As shown in FIG. 1, both longitudinally end portions of the elongate plate-shaped laminate bimorph type piezoelectric actuator 32 are linked to the fixed wall 30 through spacer blocks 34, and adhesion between each spacer block 34 and each end portion of the actuator 32 and adhesion between each spacer block 34 and the fixed wall 30 are achieved by use of a double faced adhesive tape. In addition, a longitudinally central portion of the actuator 32 is linked to one side (the side opposed to the fixed wall 30) of the movable panel unit 18 through a spacer block 36, and adhesion between the spacer block 36 and the actuator 32 and adhesion between the spacer block 36 and the one side of the movable panel unit 18 are achieved by use of a double faced adhesive tape. When a voltage is impressed on the laminate bimorph type piezoelectric actuator 32 thus mounted between the fixed wall 30 of the support structure 16 and the movable panel unit 18, the actuator 32 shows a bending displacement, so that the longitudinally central portion of the actuator 32 is displaced in the direction indicated by arrows A in FIGS. 1 and 2, thereby displacing the movable panel unit 18 in the direction indicated by arrows B. The sense and magnitude of this displacement correspond to the polarity and magnitude of the voltage impressed. Besides, the direction of the displacement of the movable panel unit 18 generated in this manner is a direction along a plane parallel to the panel surface of the movable panel unit 18. Therefore, the actuator 32 drives the movable panel unit 18 in the direction along a plane parallel to the panel surface thereof.

A hard plastic-made elongate sheet member excellent in elasticity is attached to the surface, on the opposite side of the surface to which the actuator 32 is attached, of the fixed wall 30. The sheet member is an acoustic pressure generating member 38 operative to generate an acoustic pressure by vibrating when driven by the actuator 32. Both longitudinally end portions of the acoustic pressure generating member 38 are linked to the fixed wall 30 through spacer blocks 40, and adhesion between each spacer block 40 and each end portion of the acoustic pressure generating member 38 and adhesion between each spacer block 40 and the fixed wall 30 are achieved by use of a double faced adhesive tape. The acoustic pressure generating member 38 composed of the sheet member extends perpendicularly to the driving direction of the actuator 32 indicated by arrows A, and, therefore, the direction in which the acoustic pressure generating member 38 is most easily deflected or warped coincides with the driving direction of the actuator 32. In addition, a longitudinally central portion of the acoustic pressure generating member 38 is linked to a longitudinally central portion of the actuator 32 through a link member 42. According to this configuration, when a drive signal at an acoustic frequency is inputted to the actuator 32, the actuator 32 operating according to the drive signal vibrates the acoustic pressure generating member 38, so that the acoustic pressure generating member 38 acts like a corn of a loudspeaker, whereby a sound is generated from the acoustic pressure generating member 38. Preferable examples of the material of the acoustic pressure generating member 38 include a biaxially oriented polyethylene naphthalate film (PEN film) and a biaxially oriented polyethylene terephthalate film (PET film).

The fixed wall 30 partitions the inside of the casing 12 into two chambers. The movable panel unit 18 and the actuator 32 are contained in one of the chambers (first chamber), while the acoustic pressure generating member 38 is contained in the other chamber (second chamber). These two chambers communicate with each other through the opening formed at the longitudinally central portion of the fixed wall 30 where the fixed wall 30 shows discontinuity, and the above-mentioned link member 42 extends in the opening. A reflector 44 for reflecting the sound generated from the acoustic pressure generating member 38 to the upper side in the figure is further contained in the second chamber. Besides, the casing 12 is provided with a window portion 46 for exposing the panel surface of the movable panel unit 18 contained in the first chamber, and with a window portion 48 for communication between the second chamber and the exterior. The sound generated from the acoustic pressure generating member 38 is reflected by the reflector 44, to be guided through the window portion 48 to the exterior. Therefore, the second chamber of the casing 12 and the reflector 44 contained therein constitute a sound guide section for guiding the sound generated from the acoustic pressure generating member 38.

FIG. 4 is a block diagram showing a control mechanism and an electronic circuit which are components of the touch panel display apparatus 10. In the figure, reference numeral 50 denotes a control system of an electronic device including the touch panel display apparatus 10, and the control mechanism and the electronic circuit of the touch panel display apparatus 10 are under the control of the control system 50. The control mechanism and the electronic circuit of the touch panel display apparatus 10 include a touch panel circuit 52 connected to the touch panel which is a component on one side of the movable panel unit 18, an LCD drive circuit 54 connected to the liquid crystal display panel which is a component on the other side of the movable panel unit 18, and an actuator drive control mechanism 56 for drivingly controlling the actuator 32.

The touch panel circuit 52 is a circuit annexed to a general touch panel, and is operative to process a signal obtained from the touch panel, thereby generating a signal representing the position at which the user's fingertip is making contact with the panel surface of the touch panel. In addition, where the touch panel is of the type of being able to detect the contact pressure, the touch panel circuit 52 is operative also to generate a signal representing the contact pressure. Furthermore, if necessary, the touch panel circuit 52 further processes the signal indicating the contact position on the panel surface, thereby generating signals representing the moving velocity and acceleration of the fingertip making contact with the touch panel surface. The signal or signals generated by the touch panel circuit 52 are supplied to the control system 50 as touch panel input signals. The LCD drive circuit 54 is a circuit accompanying a general liquid crystal display panel, and drives the liquid crystal display panel according to LCD control signals received from the control system 50, so as to make a visual display.

The actuator drive control mechanism 56 is composed mainly of a one-chip computer incorporating a central processor unit and a memory, and an electronic circuit, and includes an interface 58 for receiving control signals from the control system 50. The control signals received from the control system 50 include an output timing signal and a waveform selection signal. The actuator drive control mechanism 56 includes the memory 60, which stores data necessary for waveform generation (waveform data) corresponding respectively to a plurality of waveforms. The actuator drive control mechanism 56 is provided further with a waveform producing mechanism 62, a mixing circuit 64, and a power amplifier 66.

The waveform producing mechanism 62 is a mechanism composed of software, and functions to read from the memory 60 data corresponding to a waveform designated by the waveform selection signal and to produce the waveform according to the waveform data thus read. The mixing circuit 64 is for outputting an output signal having the waveform produced by the waveform producing mechanism 62 over a period designated by the output timing signal, and for outputting also the sound signal supplied from the control system 50 as an output signal. Moreover, the mixing circuit 64 is so designed as not to output these signals individually but to mix these signals and output a single output signal obtained by the mixing. Besides, the power amplifier 66 is for amplifying the output signal of the mixing circuit 64 and supplying the amplified signal as an actuator drive signal to the piezoelectric actuator 32. Thus, the actuator drive control mechanism 56 has the function as a section of superposing the sound signal on the actuator drive signal.

FIGS. 5A to 5D show specific examples of the waveforms produced by the waveform producing mechanism 62. As is clear from the figures, these waveforms are vibrational waveforms, which may be constant or varying in amplitude, period and/or wave profile. The waveform data stored in the memory 60 include data on amplitude and period. The waveform data on the waveform designated by the waveform selection signal is read from the waveform data corresponding to the plurality of waveforms and stored in the memory 60, and the actuator drive signal having the relevant waveform is supplied to the actuator 32, so that the movable panel unit 18 is vibrated along a plane parallel to the panel surface, according to the waveform of the actuator drive signal. The vibration of the movable panel unit 18 generates a tactile sensation according to the waveform of the drive signal, on the user's fingertip being in contact with the panel surface of the movable panel unit 18. In other words, therefore, the actuator drive control mechanism 56 drives the movable panel unit 18 to vibrate in a vibration pattern selected from a plurality of predetermined vibration patterns, and the plurality of predetermined vibration patterns generate different tactile sensations on the user's fingertip making contact with the panel surface of the movable panel unit 18.

What kind of tactile sensation would be generated on a fingertip was experimentally tested by setting the vibration amplitude of the movable panel unit 18 to a value of about 20 to 50 μm. As a result, it was found that the fingertip in contact with the panel surface of the movable panel unit 18 can sharply sense that the movable panel unit 18 is vibrating, but cannot discriminate the vibrating direction of the movable panel unit 18. On the other hand, it was found that clearly different tactile sensations are generated according to differences in the waveform of the output signal. Besides, it was also found possible to permit the fingertip to sense a pseudo ruggedness sensation or material sensation, depending on the vibration patterns of the movable panel unit 18.

When the control system 50 outputs a sound signal to the actuator drive control mechanism 56, the sound signal is also superposed on the actuator drive signal, and the resultant signal is supplied to the actuator 32. It is to be noted here, however, that the waveforms shown in FIGS. 5A to 5D produced by the waveform producing mechanism 62 are different in frequency band from the sound signal superposed thereon. The waveforms produced by the waveform producing mechanism 62 are for the purpose of generating the tactile sensations on the user's fingertip; therefore, the vibration frequency is set at about 50 to 200 Hz, so that the user's fingertip can sharply sense it. On the other hand, the frequency of the sound signal is generally at about 800 to 1500 Hz. Therefore, even if the user's fingertip is in contact with the panel surface of the movable panel unit 18 when a sound is generated by the touch panel display apparatus 10, the tactile sensation generated on the fingertip is not so great. In addition, where the movable panel unit 18 is vibrated by driving the actuator 32 for the purpose of generating a tactile sensation feedback, the sound generated attendant on this is also comparatively weak. Accordingly, the touch panel display apparatus 10 as above-described can function as a touch panel display apparatus configured to generate a tactile sensation on the user's fingertip operating it and also as an acoustic output device. Moreover, the touch panel display apparatus 10 can be easily made smaller in size, thickness and weight, consumes less electric power, and does not need a large number of actuators. Thus, the touch panel display apparatus 10 is very excellent as an input/output device for use in mobile type electronic devices.

A camera 70 shown in FIG. 3 has a monitor 72 at the back surface thereof, and the monitor 72 is included of the touch panel display apparatus having the structure as above-described. The touch panel display apparatus is attached to a frame inside a casing 74, a movable panel unit 18 is exposed through a first window portion 76 formed on the back side of the casing 74, and an acoustic output is emitted through a second window portion 78. In a shooting mode, a picture to be shot is displayed on the movable panel unit 18, whereas in a setting mode, various software keys are displayed. A control system of the camera 70 detects which of the software keys has been operated and how the key has been operated, based on input signals supplied from a touch panel circuit (i.e., signals representing the position, moving velocity, acceleration and operating force (contact pressure) of the user's fingertip operating the touch panel, etc.), and, according to the detection results, vibrates the movable panel unit 18 in one of various vibration patterns and/or emits an appropriate acoustic output or voice output. Various tactile sensations are generated on the user's fingertip according to the vibration patterns of the movable panel unit 18, and various kinds of information can be obtained from the tactile sensation feedback. Besides, information can be obtained also from the acoustic output or voice output.

The touch panel display apparatus 10 according to the present invention, in which the vibrating direction of the movable panel unit 18 is set along a plane parallel to the panel surface, has many merits. Among the touch panel display apparatuses configured to generate a tactile sensation feedback according to the related art, there has been a touch panel display apparatus in which a movable panel unit is vibrated in a direction perpendicular to the panel surface. In contrast to this, where a movable panel unit is vibrated along a plane parallel to the panel surface as in the present invention, the area of the surface which vibrates air is remarkably reduced, so that the movable panel unit can be vibrated with a smaller actuator drive force and, therefore, the actuator can be easily reduced in size and power consumption. Moreover, the utility of the touch panel display apparatus 10 is further enhanced by the configuration in which the touch panel display apparatus can also display the function as an acoustic output device.

The present invention is not limited to the details of the above-described preferred embodiments. The scope of the invention is defined by the appended claims, and all changes and modifications as fall within the equivalence of the scope of the claims are therefore to be embraced by the invention.

FIG. 4
50: Control system of electronic device
52: Touch panel circuit
54: LCD drive circuit
56: Actuator drive control mechanism
58: Interface
60: Memory
62: Waveform producing mechanism
64: Mixing circuit
66: Power amplifier
Acoustic signal
Control signal
Output timing signal
Waveform data
Waveform selection signal
Actuator drive signal

What is claimed is:

1. A touch panel display apparatus comprising:
a display panel unit including a touch panel;
movable support means for supporting said display panel unit so as to permit said display panel unit to be vibrated;
an actuator configured to drive said display panel unit to vibrate;
actuator drive control means for outputting an actuator drive signal to drive said actuator;
superimposing means for superimposing an acoustic signal on said actuator drive signal;
wherein said actuator vibrates said display panel unit laterally within a housing such that a tactile sensation is generated on a user's fingertip making contact with said panel surface of said display panel unit, and said actuator also simultaneously drives an acoustic pressure generating member to vibrate according to said acoustic signal, whereby a sound is generated, and the lateral motion of the actuator drives the acoustic pressure generating member to generate the sound which is reflected toward a user, and further wherein the superimposing means is comprised of a mixing circuit that combines a selected waveform and an acoustic signal.

2. The touch panel display apparatus according to claim 1, wherein said display panel is fixed on said support structure.

3. The touch panel display apparatus according to claim 1, wherein said actuator drive control means drives said display panel unit to vibrate in a vibration pattern selected from a plurality of predetermined vibration patterns, and said plurality of predetermined vibration patterns generate different senses on the user's fingertip making contact with said panel surface of said display panel unit.

4. The touch panel display apparatus according to claim 1, wherein said actuator is a bending displacement type piezoelectric actuator being elongate plate-like in shape.

5. The touch panel display according to claim 4, wherein said acoustic pressure generating member is an elongate sheet member extending perpendicularly to a drive direction of said actuator.

6. The touch panel display according to claim 1, further comprising:
sound guide means for guiding the sound generated from said acoustic pressure generating member.

7. An electronic device comprising:
a casing or frame; and
a touch panel display apparatus;
wherein said touch panel display apparatus includes
a display panel unit including a touch panel,
movable support means for supporting said display panel unit on a support structure so as to permit said display panel unit to be vibrated,
an actuator configured to drive said movable panel unit to vibrate,
actuator drive control means for outputting an actuator drive signal to drive said actuator,
an acoustic pressure generating member configured to generate an acoustic pressure by being driven by said actuator to vibrate, and,
superimposing means for superimposing an acoustic signal on said actuator drive signal,
wherein said actuator drives said display panel unit laterally within a housing to vibrate, whereby a tactile sensation is generated on a user's fingertip making contact with said panel surface of said movable panel unit, and said actuator simultaneously drives said acoustic pressure generating member to vibrate according to said acoustic signal, whereby a sound is generated, and the lateral motion of the actuator drives the acoustic pressure generating member to generate the sound which is reflected toward a user, and further wherein the superimposing means is comprised of a mixing circuit that combines a selected waveform and an acoustic signal.

8. The electronic device according to claim 7, wherein said display panel is fixed on said casing or frame.

9. A camera comprising:
a casing or frame; and
a display panel unit including a touch panel,
movable support means for supporting said display panel unit on a support structure so as to permit said display panel unit to vibrate,
an actuator configured to drive said display panel unit to vibrate laterally within a housing,
actuator drive control means for outputting an actuator drive signal to drive said actuator;
an acoustic pressure generating member configured to generate an acoustic pressure by being driven by said actuator to vibrate, and superimposing means for superimposing an acoustic signal on said actuator drive signal, wherein said actuator drives said display panel unit to vibrate, whereby a tactile sensation is generated on a user's fingertip making contact with said panel surface of said movable panel unit, and said actuator simultaneously drives said acoustic pressure generating member to vibrate according to said acoustic signal, whereby a sound is generated, and the lateral motion of the actuator drives the acoustic pressure generating member to generate the sound which is reflected toward a user, and further wherein the superimposing means is comprised of a mixing circuit that combines a selected waveform and an acoustic signal.

10. The camera according to claim 9, wherein said display panel is fixed on said casing or frame.

11. The touch panel display apparatus according to claim 1, wherein
said actuator is mechanically connected to the display panel unit and the acoustic pressure generating member in order to provide simultaneous vibration of each structure.

12. The electronic device according to claim 7, wherein said actuator is mechanically connected to the display panel unit and the acoustic pressure generating member in order to provide simultaneous vibration of each structure.

13. The camera according to claim 9, wherein said actuator is mechanically connected to the display panel unit and the acoustic pressure generating member in order to provide simultaneous vibration of each structure.

* * * * *